United States Patent
Kim (10) Patent No.: US 9,338,742 B2
(45) Date of Patent: May 10, 2016

(54) METHOD AND APPARATUS FOR REDUCING POWER CONSUMPTION OF RECEIVER

(71) Applicant: Samsung Electronics Co., Ltd., Suwon-si (KR)

(72) Inventor: Jong Pal Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 14/044,243

(22) Filed: Oct. 2, 2013

(65) Prior Publication Data

US 2014/0148208 A1    May 29, 2014

(30) Foreign Application Priority Data

Nov. 29, 2012    (KR) .................. 10-2012-0136927

(51) Int. Cl.
*H04W 52/02* (2009.01)
(52) U.S. Cl.
CPC ...... *H04W 52/0209* (2013.01); *H04W 52/0229* (2013.01); *H04W 52/0216* (2013.01); *Y02B 60/50* (2013.01)
(58) Field of Classification Search
CPC .................. H04W 52/0209; H04W 52/0216; H04W 52/0229; H04W 74/0808; H04W 84/18
See application file for complete search history.

(56) References Cited

U.S. PATENT DOCUMENTS

| | | | |
|---|---|---|---|
| 6,897,788 B2 | 5/2005 | Khair et al. | |
| 7,801,620 B2* | 9/2010 | Freeberg | H04B 17/345 607/32 |
| 8,792,983 B2* | 7/2014 | Von Arx | A61N 1/08 607/32 |
| 8,912,908 B2* | 12/2014 | Berkman | A61B 5/0538 340/10.1 |
| 8,956,287 B2* | 2/2015 | Zdeblick | G06F 19/3456 128/903 |
| 8,961,412 B2* | 2/2015 | Hafezi | A61B 5/073 128/902 |
| 2012/0083911 A1* | 4/2012 | Louboutin | G06F 3/002 700/94 |
| 2012/0093245 A1 | 4/2012 | Makdissi et al. | |

FOREIGN PATENT DOCUMENTS

| | | |
|---|---|---|
| JP | 2005-210694 A | 8/2005 |
| JP | 2009-164992 A | 7/2009 |
| KR | 2002-0072538 A | 9/2002 |
| KR | 2002-0077355 A | 10/2002 |
| KR | 10-2009-0067549 A | 6/2009 |
| KR | 10-2010-0086050 A | 7/2010 |
| KR | 10-0971635 B1 | 7/2010 |
| KR | 10-2010-0118567 A | 11/2010 |
| KR | 10-2011-0114868 A | 10/2011 |

OTHER PUBLICATIONS

Abdelmalik, Bachir et al. "*MAC essentials for wireless sensor networks*" Communications Surveys & Tutorials, IEEE 12.2 (2010) (28 pages in English).

(Continued)

*Primary Examiner* — Bobbak Safaipour
(74) *Attorney, Agent, or Firm* — NSIP Law (57) ABSTRACT

A method of reducing power consumption of a receiver includes identifying a plurality of sensors for transmitting a signal, generating data for controlling a transmission operation of the plurality of sensors, and transmitting the data to the plurality of sensors.

19 Claims, 5 Drawing Sheets

(56) References Cited

OTHER PUBLICATIONS

IEEE 802 Working Group. "*IEEE Standard for Local and Metropolitan Area Networks—Part 15.4: Low-Rate Wireless Personal Area Networks (LR-WPANs)*." IEEE Std 802 (2011) (314 pages in English).

Extended European Search Report issued on Jan. 13, 2016 in counterpart European Application No. 13184711.3 (10 pages in English).

* cited by examiner

METHOD AND APPARATUS FOR REDUCING POWER CONSUMPTION OF RECEIVER

CROSS-REFERENCE TO RELATED APPLICATIONS

This application claims the benefit under 35 USC 119(a) of Korean Patent Application No. 10-2012-0136927 filed on Nov. 29, 2012, in the Korean Intellectual Property Office, the disclosure of which is incorporated herein by reference in its entirety for all purposes.

BACKGROUND

1. Field

The following description relates to a method and apparatus for reducing power consumption of a receiver in a system for transmitting and receiving a signal.

2. Description of Related Art

A biological signal refers to a brain wave, a blood pressure, a pulse wave, a body temperature, and other signals indicative of biological properties detected from a human body. Detected biological signals are widely employed in medical fields such as treating or diagnosing diseases, and other medical fields. Recently, intensive research into medical devices through which a patient may perform self-assessment of a biological signal has been conducted. For example, an apparatus for measuring a biological signal worn on a body of a measurement subject to verify a current condition of the measurement subject is being used for health screenings, emergency situations, and the other situations in which it is necessary to measure a biological signal.

Generally, the apparatus for measuring the biological signal may be on constant stand-by in an active mode in which receiving a biological signal is possible to receive the biological signal from a single sensor or a plurality of sensors attached to a body. When the apparatus for measuring the biological signal is on constant stand-by in the active mode, a greater amount of power may be consumed than in a sleep mode in which receiving the biological signal is not be possible.

SUMMARY

In one general aspect, a method of reducing power consumption of a receiver includes identifying a plurality of sensors configured to transmit a signal; generating data to control a transmission operation of the plurality of sensors; and transmitting the data to the plurality of sensors.

The generating of the data to control the transmission operation of the plurality of sensors identified may include generating data to control the transmission operation of the plurality of sensors based on either one or both of a number of the plurality of sensors and identification information of the plurality of sensors.

The generating of the data to control the transmission operation of the plurality of sensors identified may include generating data to adjust a transmission time of the plurality of sensors.

The generating of the data to control the transmission operation of the plurality of sensors identified may include generating data to adjust the transmission operation for a signal to be transmitted by the plurality of sensors at predetermined intervals.

The data may include time information indicating a period of time required to elapse before a sensor is permitted to transmit a signal subsequent to the sensor receiving the data.

The generating of the data to control the transmission operation of the plurality of sensors identified may include generating data to adjust a communication frequency of the plurality of sensors.

The generating of the data to control the transmission operation of the plurality of sensors identified may include generating data to assign different communication frequencies or different communication frequency bands to the plurality of sensors.

The method may further include setting an active mode period in which receiving of a signal is enabled and a sleep mode period in which receiving of a signal is disabled based on a transmission time of the plurality of sensors.

The setting of the active mode period in which receiving of the signal is enabled and the setting of the sleep mode period in which receiving of the signal is disabled based on the transmission time of the plurality of sensors may include setting the active mode period based on a transmission period at which the plurality of sensors transmit a signal and the transmission time of the plurality of sensors.

In another general aspect, a non-transitory computer-readable storage medium stores a program for controlling a computer to perform the method described above.

In another general aspect, an apparatus for reducing power consumption comprises a sensor identifying unit configured to identify a plurality of sensors configured to transmit a signal; a data generating unit configured to generate data to control a transmission operation of the plurality of sensors; and a data transmitting unit configured to transmit the data to the plurality of sensors.

The data generating unit may be further configured to generate data to control the transmission operation of the plurality of sensors based on any one or any combination of a number of the plurality of sensors and identification information of the plurality of sensors.

The data generating unit may be further configured to generate data to adjust a transmission time of the plurality of sensors.

The data generating unit may be further configured to generate data to adjust the transmission operation of the plurality of sensors for a signal to be transmitted by the plurality of sensors at predetermined intervals.

The data may include time information indicating a period of time required to elapse before a sensor is permitted to transmit a signal subsequent to the sensor receiving the data.

The data generating unit may be further configured to generate data to adjust a communication frequency of the plurality of sensors.

The data generating unit may be further configured to generate data to assign different communication frequencies or different communication frequency bands to the plurality of sensors.

The apparatus may further include an operation mode setting unit for setting an active mode period in which receiving of a signal is enabled and a sleep mode period in which receiving of a signal is disabled based on a transmission time of the plurality of sensors.

The operation mode setting unit may be further configured to set the active mode period based on a transmission period at which the plurality of sensors transmit a signal and the transmission time of the plurality of sensors.

In another general aspect, a method of reducing power consumption of a receiver includes generating data to control a plurality of sensors configured to transmit a signal to the receiver so that all of the plurality of sensors transmit respective signals to the receiver within a single period during which the receiver is enabled to receive signals without creating interference between the signals; and transmitting the data to the plurality of sensors.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Figure 1:
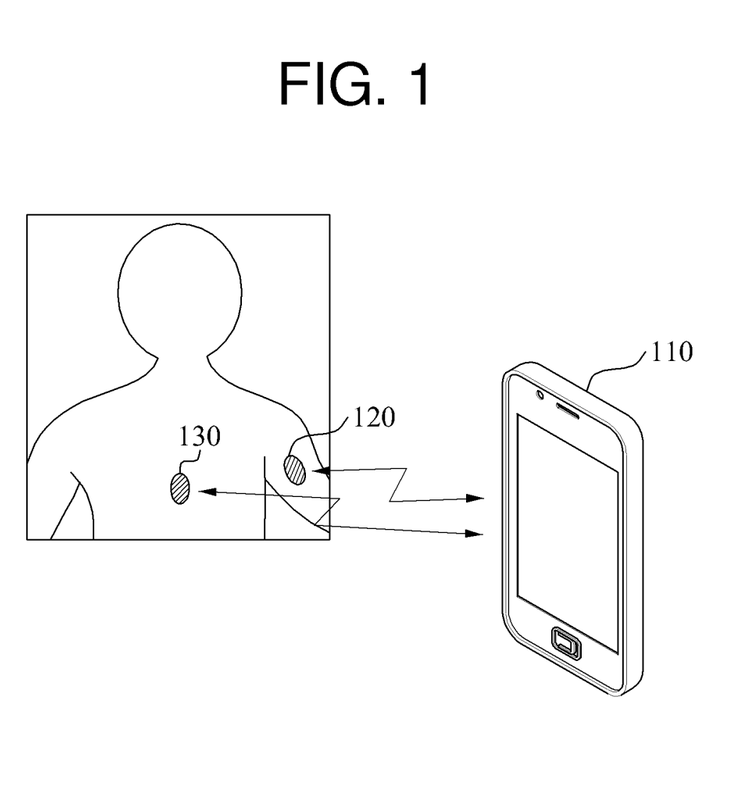
FIG. 1 is a diagram illustrating an example of an overall configuration of a system for transmitting and receiving a signal.

FIG. 1 is a diagram illustrating an example of an overall configuration of a system for transmitting and receiving a signal. Referring to FIG. 1, the system for transmitting and receiving the signal includes a plurality of sensors 120 and 130 and a receiver 110.

The plurality of sensors 120 and 130 may measure a signal such as a biological signal, an electric signal, and other signals, and transmit the measured signal to the receiver 110. For example, the plurality of sensors 120 and 130 may measure the biological signal while being attached to or disposed adjacent to a body, and transmit the measured biological signal to the receiver. The plurality of sensors 120 and 130 may measure a signal based on an electric change of a body, a biochemical change, an amount of physical exercise being performed, an environmental change, and other factors, and transmit the measured signal to the receiver 110.

The biological signal may be a brain wave, a blood pressure, a pulse wave, a body temperature, or any other signal containing information about a body, and may include an electric signal generated in a body, an electric signal measured by applying electricity to a body, a signal measured optically, a signal measured using an ultrasonic wave, a signal measured using an electric wave, information on body temperature measured by heat transfer, biochemical signal information, movement information, information on environment of the body, and any other type of signal measured in any way known to one of ordinary skill in the art.

For example, the biological signal may include the biochemical signal information, such as an electrocardiogram (ECG) in which an action current involved in contraction of a heart is recorded, electromyography (EMG) in which an action potential of a muscle is recorded, an electroencephalogram (EEG) in which an electric current involved in a brain action is recorded, a blood oxygen saturation, a blood sugar, and anemia.

The plurality of sensors 120 and 130 may measure various signals in addition to the biological signal to be transmitted along with the biological signal to the receiver 110. The examples described herein are not limited to any particular type of signal measured by the plurality of sensors 120 and 130, but may be applied to any type of signal capable of being measured by the sensors 120 and 130.

The plurality of sensors 120 and 130 transmit the measured signal to the receiver 110 using wireless communication. The plurality of sensors 120 and 130 may each transmit the measured signal to the receiver 110 at respective predetermined intervals. The plurality of sensors 120 and 130 may not be the same type of sensor, and a measurement may not be performed on the same signal by each of the plurality of sensors 120 and 130. A transmission period of the plurality of sensors 120 and 130 may differ, and each respective transmission period may be integer multiples of one another. For example, when a transmission period of a first sensor is 1 second (s), a transmission period of a second sensor may not be required to also be 1 s. For example, the transmission period of the second sensor may be an integer multiple of the transmission period of 1 s of the first sensor, such as 2 s, 3 s, etc.

The plurality of sensors 120 and 130 may receive, from the receiver 110, data associated with a transmission time at which a signal is transmitted, and adjust the transmission time of the signal based on the received data. For example, the plurality of sensors 120 and 130 may transmit a signal at a predetermined point in time, or delay transmission of the signal based on time information included in the received data.

Alternatively, the plurality of sensors 120 and 130 may receive, from the receiver 110, data associated with a frequency used by the plurality of sensors 120 and 130, and set a frequency or a frequency band based on the received data.

The receiver 110 receives a signal transmitted from the plurality of sensors 120 and 130. The receiver 110 may store or analyze the received signal, and display the analyzed result on a screen. To receive a signal, the receiver 110 may be disposed inside a portable device such as a mobile phone, a personal digital assistant (PDA), and other types of portable devices known to one of ordinary skill in the art, or disposed on an exterior of the portable device.

The receiver 110 may include an apparatus for reducing power consumption to reduce an amount of power consumed by the receiver 110. The apparatus for reducing power consumption may control the receiver 110 to be operated in a timing adjustment mode for transmission and reception, or in a normal mode. In the timing adjustment mode for transmission and reception, the apparatus for reducing power consumption may transmit data associated with a transmission time or a frequency to control a transmission time of the plurality of sensors 120 and 130 or a frequency band to be used by the plurality of sensors 120 and 130. In the normal mode, the apparatus for reducing power consumption may set a period in which receiving a signal is enabled and a period in which receiving a signal is disabled. Accordingly, the receiver 110 may receive a signal from the plurality of sensors 120 and 130 only in a predetermined period.

More particularly, the apparatus for reducing power consumption may set two types of operation modes associated with an operation of the receiver 110. For example, the apparatus for reducing power consumption may set an active mode period in which a signal having a relatively greater level of power consumption transmitted from a sensor is able to be received, or a sleep mode period in which a signal is unable to be received.

The apparatus for reducing power consumption may adjust the transmission time of the plurality of sensors 120 and 130 based on a number of sensors configuring a system for transmitting and receiving a signal or identification information of the plurality of sensors 120 and 130. The identification information of the plurality of sensors 120 and 130 may include any one or any combination of identification (ID) of a sensor, a transmission period at which the sensor transmits a signal, and information about a signal measured by the sensor. The apparatus for reducing power consumption may identify a number of sensors, a type of sensor, and other information about the sensor through the ID of the sensor. The apparatus for reducing power consumption may provide the adjusted transmission time to the plurality of sensors 120 and 130 to control the plurality of sensors 120 and 130 to transmit a signal based on the adjusted transmission time.

In another example, the receiver 110 may receive a broadband frequency, and generate data for assigning different communication frequencies or frequency bands for the plurality of sensors 120 and 130. The apparatus for reducing power consumption may adjust a frequency or a frequency band used by the plurality of sensors 120 and 130 by transmitting the generated data to the plurality of sensors 120 and 130.

For example, the apparatus for reducing power consumption may generate data for assigning different frequency bands for the plurality of sensors 120 and 130 by identifying the plurality of sensors 120 and 130 in the timing adjustment mode for transmission and reception, and transmit the generated data to the plurality of sensors 120 and 130. The plurality of sensors 120 and 130 receiving the data may set a frequency to be used in communication based on frequency information included in the data, and transmit a signal to the receiver 110 using the set frequency. The plurality of sensors 120 and 130 may transmit the signal to the receiver 110 at different frequencies at substantially simultaneously, i.e., at about the same time. Accordingly, the apparatus for reducing power consumption may minimize the active mode period for receiving a signal. The plurality of sensors 120 and 130 may transmit a signal to the receiver 110 at predetermined intervals based on a point of time at which data is received from the apparatus for reducing power consumption.

Through such a process, the apparatus for reducing power consumption may minimize the active mode period of the receiver 110 operating in a predetermined period. For example, the apparatus for reducing power consumption may adjust a signal of the plurality of sensors 120 and 130 to be received during a single period of the active mode period. Thus, the apparatus for reducing power consumption may minimize time spent required for converting to the active mode from a sleep mode and power consumption required for converting a mode.

Figure 2:
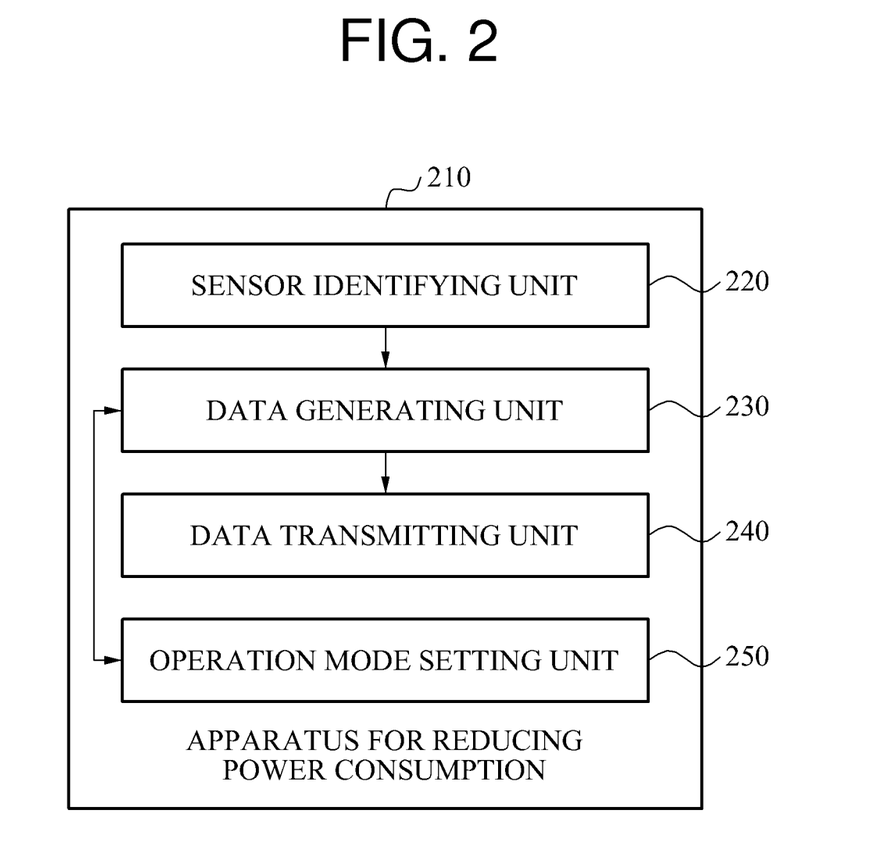
FIG. 2 is a diagram illustrating an example of a detailed configuration of an apparatus for reducing power consumption.

FIG. 2 is a diagram illustrating an example of a detailed configuration of an apparatus 210 for reducing power consumption. Referring to FIG. 2, the apparatus 210 for reducing power consumption includes a sensor identifying unit 220, a data generating unit 230, a data transmitting unit 240, and an operation mode setting unit 250.

The sensor identifying unit 220 identifies a plurality of sensors for transmitting a signal. For example, the sensor identifying unit 220 may identify a number of the plurality of sensors for transmitting the signal based on a signal received from a sensor. The sensor identifying unit 220 may identify any one or any combination of a number of the plurality of sensors, a transmission period of the plurality of sensors, and a signal measured by the sensor based on identification information received from the plurality of sensors, such as an ID of the sensor.

The data generating unit 230 generates data for controlling a transmission operation of the plurality of sensors. The data generating unit 230 may generate data for controlling a transmission operation of the plurality of sensors based on either one or both of the number of the plurality of sensors and the identification information of the sensor.

The data generating unit 230 may generate data for adjusting a transmission time at which the plurality of sensors transmits a signal. For example, the data generating unit 230 may determine the transmission time for the plurality of sensors based on a number of sensors, and generate data associated with the transmission time of the plurality of sensors. The generated data may include time information indicating a period of time required to elapse before a sensor is permitted to transmit a signal subsequent to the sensor receiving the generated data. The time information may be determined relatively based on the number of the plurality of sensors. Alternatively, the data generating unit 230 may generate data for controlling a transmission operation of the plurality of sensors based on a transmission period at which the plurality of sensors transmits a signal.

More particularly, the data generating unit 230 may generate data for adjusting a transmission operation of the plurality of sensors for the plurality of sensors to transmit a signal at predetermined intervals. The predetermined intervals may be adjusted based on any one or any combination of a number of sensors, a degree of interference created by signals transmitted by the plurality of sensors, and a type of a signal transmitted by the sensor.

When the signals are transmitted by the plurality of sensors simultaneously, interference between the transmitted signals may occur, and thus distinguishing the signals received simultaneously may be difficult. Accordingly, to prevent an occurrence of interference, an interval may be necessary between transmission times of the plurality of sensors. Such an interval may be set in advance by a system designer, and may be changed. For example, the system designer may determine the interval for minimizing a difference between the transmission times without creating interference between signals. The interval may vary based either one or both of a type and a property of a signal.

The data generating unit 230 may verify a transmission time of the plurality of sensors periodically to generate data for readjusting the transmission time of the plurality of sensors. Thus, the apparatus for reducing power consumption may manage the transmission time of the plurality of sensors consistently.

The data generating unit 230 may generate data for adjusting a communication frequency of the plurality of sensors based on a number of sensors transmitting a signal. For example, the data generating unit 230 may generate data for assigning different communication frequencies or different communication frequency bands to the plurality of sensors. The data generated by the data generating unit 230 may include either one or both of communication frequency information indicating a communication frequency and a communication frequency band to be assigned to the plurality of sensors.

The data generating unit 230 may generate data for adjusting the communication frequency of the plurality of sensors and the transmission time of the plurality of sensors. For example, the data generating unit 230 may generate data including communication frequency information indicating the communication frequency assigned to the plurality of sensors and time information indicating a period of time required to elapse before a sensor is permitted to transmit a signal subsequent to the sensor receiving the generated data. The data generating unit 230 may generate data for adjusting the transmission time of the plurality of sensors for the plurality of sensors to transmit a signal simultaneously or substantially simultaneously, i.e., at about the same time. Accordingly, the active mode period to be set may be minimized.

The data transmitting unit 240 transmits the data generated in the data generating unit 230 to the plurality of sensors. When a sensor receives data from the data transmitting unit 240, the sensor may transmit, to a receiver, a signal at a transmission time determined based on time information included in the received data. For example, transmission of the signal by the sensor may be delayed for a period of time determined based on the time information, based on a point of time at which the data is received, and transmit the signal to the receiver. Alternatively, the sensor may set a communication frequency, or a communication frequency band to be used based on the communication frequency information included in the data received, and transmit the signal to the receiver using the set communication frequency or the set communication frequency band.

The operation mode setting unit 250 sets an active mode period in which receiving a signal is enabled and a sleep mode period in which receiving a signal is disabled based on a transmission time of the plurality of sensors. The operation mode setting unit 250 may set an optimal active mode period and an optimal sleep mode period based on any one or any combination of a number of sensors, a transmission period at which the plurality of sensors transmits a signal, a type of the signal transmitted by the sensor, a waiting time required for converting a mode, and other factors.

The apparatus 210 for reducing power consumption may minimize a period in which the receiver operates in the active mode during a single period, and a number of times for converting a mode.

Figure 3A:
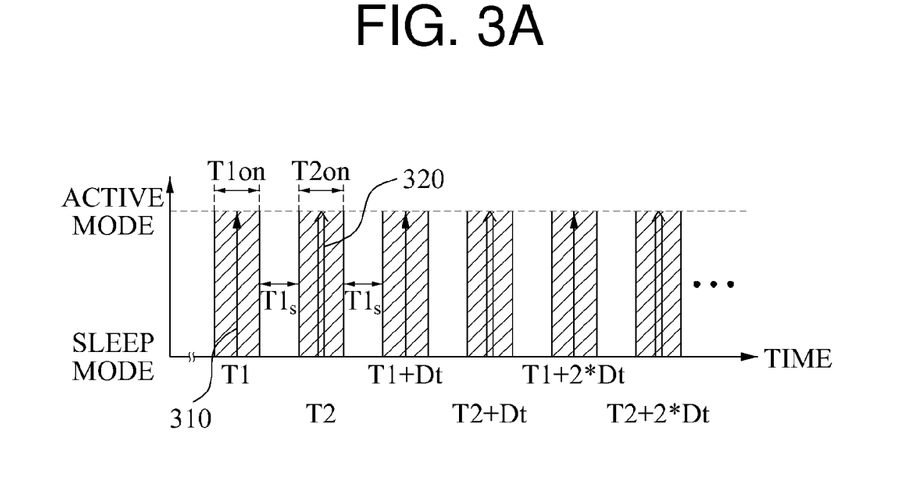
FIGS. 3A and 3B are diagrams illustrating examples of adjusting a transmission time of a plurality of sensors.
Figure 3B:
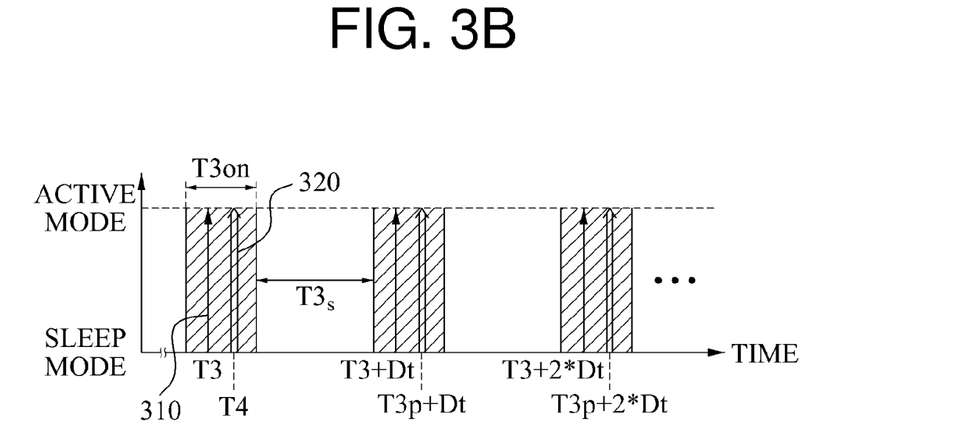

FIGS. 3A and 3B are diagrams illustrating examples of adjusting a transmission time of a plurality of sensors. Referring to FIGS. 3A and 3B, a mode conversion state of a receiver during reception of a signal from the two sensors is illustrated. FIG. 3A illustrates an instance in which the transmission time of the plurality of sensors has not been adjusted, and FIG. 3B illustrates an instance in which an apparatus for reducing power consumption has adjusted the transmission time of the plurality of sensors.

The receiver may perform a mode conversion between an active mode period and a sleep mode period. As shown in FIG. 3A, a first signal 310 transmitted from a first sensor and a second signal 320 transmitted from a second sensor may be received at predetermined intervals (Dt). The first signal 310 and the second signal 320 may be received in different active mode periods, thus wasting a start-up time and an amount of start-up electricity for converting a mode. Generally, the start-up time required for converting a mode may be relatively longer than a period of time for receiving a signal. In this example, the transmission time at which the signal is transmitted from the sensor and a reception time at which the signal is received by the receiver may be identical.

T1 denotes a transmission time of the first signal 310, and T2 denotes a transmission time of the second signal 320. Dt denotes an interval at which the first signal 310 and the second signal 320 are transmitted. That is, Dt denotes an interval between successive first signals 310, and an interval between successive second signals 320. In the example of FIGS. 3A and 3B, a transmission period of the first signal 310 and a transmission period of the second signal 320 are assumed to be identical. T1on denotes the active mode period required for the first signal 310 to be received, and T2on denotes the active mode period required for the second signal 320 to be received. T1s denotes a sleep mode period starting from an end of the active mode period of the first signal to a start of the active mode period of a successive second signal. T2s denotes a sleep mode period starting from an end of the active mode period of the second signal to a start of the active mode period of a successive first signal.

A ratio of power consumption when the receiver operates in an active mode constantly to power consumption when the sleep mode period is present as shown in FIG. 3A may be calculated by the following Equation 1.

$$(T1on+T2on)/(T1on+T1s+T2on+T2s) \qquad (1)$$

When T1on and T2on are identical, and T1s and T2s are identical, Equation 1 may be rewritten as the following Equation 2.

$$(T1on)/(T1on+T1s) \qquad (2)$$

As shown in FIG. 3A, when an individual active mode period is set for a plurality of signals received from the plurality of sensors, power consumption of the receiver may increase in proportion to a number of sensors included in the plurality of sensors. Since a period of time required for converting a mode increases in proportion to the number of sensors included in the plurality of sensors, when a number of sensors is greater than a predetermined number, performing a mode conversion may not be possible.

FIG. 3B illustrates an example of a pattern in which a plurality of signals is received by the receiver subsequent to the apparatus for reducing power consumption adjusting a transmission time of the plurality of sensors.

The apparatus for reducing power consumption may identify a plurality of sensors transmitting the first signal 310 and the second signal 320, and generate data for adjusting a transmission time of the plurality of sensors based on the number of the plurality of sensors. For example, the apparatus for reducing power consumption may generate data for adjusting the first signal 310 and the second signal 320 to minimize a time between the transmission time of the first signal 310 and the transmission time of the second signal 320 within a range in which interference is not created between the first signal 310 and the second signal 320. The apparatus for reducing power consumption may adjust the transmission time at which the plurality of sensors transmits a signal by transmitting the generated data to the plurality of sensors. The generated data may include time information indicating a period of time required to elapse before a sensor is permitted to transmit a signal subsequent to the sensor receiving the generated data. When the sensor receives the generated data from the apparatus for reducing power consumption, the sensor may transmit the signal at the transmission time determined based on the generated data.

When the transmission time of the plurality of sensors is adjusted through such a process, a signal may be received by the receiver in a pattern shown in FIG. 3B. As shown in FIG.

3B, T3 denotes an adjusted transmission time of the first signal 310, and T4 denotes an adjusted transmission time of the second signal 320. During a single period of an active mode period T3on, the first signal 310 and the second signal 320 may be verified to be received, and a sleep mode period T3s may be present between the plurality of active mode periods T3on.

For example, the apparatus for reducing power consumption may adjust the transmission time of the plurality of sensors to receive the signals 310 and 320 received from the plurality of sensors during the same single period of the active mode period T3on. A ratio of power consumption when the receiver operates in the active mode constantly to power consumption when the transmission time of the plurality of sensors is adjusted as shown in FIG. 3B may be defined by the following Equation 3.

$$T3on/(T3on+T3s) \qquad (3)$$

Since a difference between the transmission time T3 at which the first signal 310 is transmitted and the transmission time T4 at which the second signal 320 is transmitted is significantly less than T3on, T3on may be almost identical to T1on and T2on in FIG. 3A. When T1s and T2s are identical, Equation 3 may be rewritten as the following Equation 4.

$$T1on/(T1on+T1s+T2on+T2s)=T1on/(2*T1on+2*T1s) \qquad (4)$$

When comparing a result of Equation 4 and a result of Equation 2, it may be seen that the power consumption in FIG. 3B is reduced to about 50% of the power consumption in FIG. 3A.

For example, the apparatus for reducing power consumption may minimize power consumption of the receiver by adjusting the transmission time of the plurality of sensors to receive a plurality of signals for the plurality of sensors during a single period of the active mode period. Since a signal for a total number of sensors may be received during a single period of the active mode period despite an increase in a number of sensors configuring a system for transmitting and receiving a signal, an increase in power consumption and an increase in a required start-up time due to the increased number of sensors may be minimized.

Figure 4:
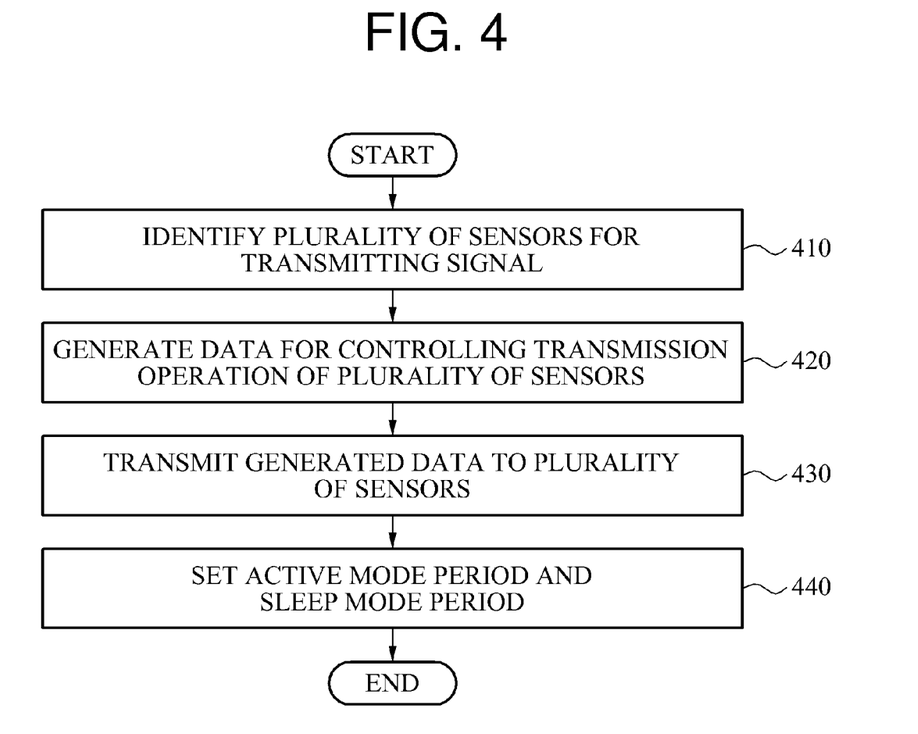
FIG. 4 is a flowchart illustrating an example of a method of reducing power consumption of a receiver.

FIG. 4 is a flowchart illustrating an example of a method of reducing power consumption of a receiver. Referring to FIG. 4, in 410, an apparatus for reducing power consumption identifies a plurality of sensors for transmitting a signal. For example, the apparatus for reducing power consumption may identify a number of the plurality of sensors for transmitting a signal based on a signal received from a sensor. The apparatus for reducing power consumption may identify any one or any combination of a number of the plurality of sensors, a transmission period of the plurality of sensors, and a signal measured by the sensor based on identification information received from the plurality of sensors, such as an ID of the sensor.

In 420, the apparatus for reducing power consumption generates data for controlling a transmission operation of the plurality of sensors. For example, the apparatus for reducing power consumption may generate data for adjusting a transmission time at which the plurality of sensors transmits a signal.

The apparatus for reducing power consumption may generate data for controlling a transmission operation of the plurality of sensors based on either one or both of a number of sensors included in the plurality of sensors and identification information of the sensor. For example, the apparatus for reducing power consumption may determine the transmission time for the plurality of sensors based on the number of sensors included in the plurality of sensors, and generate data associated with the transmission time of the plurality of sensors. The generated data may include time information indicating a period of time required to elapse before a sensor is permitted to transmit a signal subsequent to the sensor receiving the generated data. Alternatively, the apparatus for reducing power consumption may generate data for controlling a transmission operation of the plurality of sensors based on a transmission period at which the plurality of sensors transmits a signal.

More particularly, the apparatus for reducing power consumption may generate data for adjusting a transmission operation of the plurality of sensors for the plurality of sensors to transmit a signal at predetermined intervals. The predetermined intervals may be adjusted based on any one or any combination of the number of sensors included in the plurality of sensors, a degree of interference created by the plurality of signals transmitted by the plurality of sensors, and a type of the signal transmitted by the sensor.

The apparatus for reducing power consumption may generate data for readjusting a transmission time of the plurality of sensors by verifying the transmission time of the plurality of sensors periodically. Thus, the apparatus for reducing power consumption may manage the transmission time of the plurality of sensors consistently.

The apparatus for reducing power consumption may generate data for adjusting a communication frequency of the plurality of sensors based on the number of the plurality of sensors for transmitting the signal. For example, the apparatus for reducing power consumption may generate data for assigning different communication frequencies or different communication frequency bands to the plurality of sensors. The data generated by the apparatus for reducing power consumption may include communication frequency information indicating a communication frequency or a communication frequency band to be assigned to the plurality of sensors.

The apparatus for reducing power consumption may generate data for adjusting the communication frequency of the plurality of sensors and the transmission time of the plurality of sensors concurrently. For example, the apparatus for reducing power consumption may generate data including communication frequency information indicating the communication frequency assigned to the plurality of sensors and time information indicating a period of time required to elapse before a sensor is permitted to transmit a signal subsequent to the sensor receiving the generated data. The apparatus for reducing power consumption may generate data for adjusting the transmission time of the plurality of sensors for the plurality of sensors to transmit a signal simultaneously or substantially simultaneously, i.e., at about the same time. Accordingly, the active mode period to be set may be minimized.

In 430, the apparatus for reducing power consumption transmits the generated data to the plurality of sensors. The sensor may transmit a signal to a receiver based on the time information included in the data. For example, the sensor may wait for a period of time determined based on the time information based on a point of time at which the generated data is received, and then transmit the signal to the receiver. Alternatively, the sensor may set a communication frequency or a communication frequency band to be used based on the communication frequency information included in the data received, and transmit the signal to the receiver using the set communication frequency or the set communication frequency band. The sensor may transmit the signal based on the time information included in the data and the communication frequency information.

In 440, the apparatus for reducing power consumption sets an active mode period in which receiving a signal is enabled and a sleep mode period in which receiving a signal is disabled based on a transmission time of the plurality of sensors. The apparatus for reducing power consumption may set an optimal active mode period and an optimal sleep mode period based on any one or any combination of a number of the plurality of sensors, a transmission period at which the plurality of sensors transmits a signal, a type of the signal transmitted by the sensor, a waiting time required for converting a mode, and other information.

The receiver 110 and the plurality of sensors 120 and 130 illustrated in FIG. 1 and the apparatus 210 for reducing power consumption, the sensor identifying unit 220, the data generating unit 230, the data transmitting unit 240, and the operation mode setting unit 250 illustrated in FIG. 2 that perform the operations illustrated in FIGS. 3A, 3B, and 4 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of reducing power consumption of a receiver, the method comprising:
    identifying sensors configured to transmit a signal;
    generating data to control a transmission operation of the sensors; and
    transmitting the data to the sensors,
        wherein the generating data comprises combining a transmission time of a first sensor and a transmission time of a second sensor into a single period of an active mode section, each active mode section being separated from another active mode section by a sleep mode section during which receiving of the signal is disabled, and
        wherein the data comprises time information indicating a period of time required to elapse before a sensor is permitted to transmit a signal in response to the sensor receiving the data.

2. The method of claim 1, wherein the generating of the data to control the transmission operation of the sensors identified comprises generating data to control the transmission operation of the sensors based on either one or both of a number of the sensors and identification information of the sensors.

3. The method of claim 1, wherein the generating of the data to control the transmission operation of the sensors identified comprises generating data to adjust a transmission time of the sensors.

4. The method of claim 1, wherein the generating of the data to control the transmission operation of the sensors identified comprises generating data to adjust the transmission operation for a signal to be transmitted by the sensors at predetermined intervals.

5. The method of claim 1, wherein the generating of the data to control the transmission operation of the sensors identified comprises generating data to adjust a communication frequency of the sensors.

6. The method of claim 1, wherein the generating of the data to control the transmission operation of the sensors identified comprises generating data to assign different communication frequencies or different communication frequency bands to the sensors.

7. The method of claim 1, further comprising setting an active mode period in which receiving of a signal is enabled and a sleep mode period in which receiving of a signal is disabled based on a transmission time of the sensors.

8. The method of claim 7, wherein the setting of the active mode period in which receiving of the signal is enabled and the setting of the sleep mode period in which receiving of the signal is disabled based on the transmission time of the sensors comprises setting the active mode period based on a transmission period at which the sensors transmit a signal and the transmission time of the sensors.

9. A non-transitory computer-readable storage medium storing a program for controlling a computer to perform the method of claim 1.

10. An apparatus for reducing power consumption, the apparatus comprising:
    a sensor identifying unit configured to identify a sensors configured to transmit a signal;
    a data generating unit configured to generate data to control a transmission operation of the sensors; and
    a data transmitting unit configured to transmit the data to the sensors,
        wherein the data generating unit is further configured to combine a transmission time of a first sensor and a transmission time of a second sensor into a single period of an active mode section, each active mode section being separated from another active mode section by a sleep mode section during which receiving of the signal is disabled, and
        wherein the data comprises time information indicating a period of time required to elapse before a sensor is permitted to transmit a signal in response to the sensor receiving the data.

11. The apparatus of claim 10, wherein the data generating unit is further configured to generate data to control the transmission operation of the sensors based on any one or any combination of a number of the sensors and identification information of the sensors.

12. The apparatus of claim 10, wherein the data generating unit is further configured to generate data to adjust a transmission time of the sensors.

13. The apparatus of claim 10, wherein the data generating unit is further configured to generate data to adjust the transmission operation of the sensors for a signal to be transmitted by the sensors at predetermined intervals.

14. The apparatus of claim 10, wherein the data generating unit is further configured to generate data to adjust a communication frequency of the sensors.

15. The apparatus of claim 10, wherein the data generating unit is further configured to generate data to assign different communication frequencies or different communication frequency bands to the sensors.

16. The apparatus of claim 10, further comprising an operation mode setting unit for setting an active mode period in which receiving of a signal is enabled and a sleep mode period in which receiving of a signal is disabled based on a transmission time of the sensors.

17. The apparatus of claim 16, wherein the operation mode setting unit is further configured to set the active mode period based on a transmission period at which the sensors transmit a signal and the transmission time of the sensors.

18. A method of reducing power consumption of a receiver, the method comprising:
    generating data to control sensors configured to transmit a signal to the receiver so that all of the sensors transmit respective signals to the receiver within a single active period during which the receiver is enabled to receive signals without creating interference between the signals, each active period being separated from another active period by a sleep period during which receiving of the signal is disabled; and
    transmitting the data to the sensors, wherein the data comprises time information indicating a period of time required to elapse before a sensor is permitted to transmit a signal in response to the sensor receiving the data.

19. The method of claim 1, wherein the power consumption efficiency of the transmission is $T1_{on}/(2*T1_{on}+2*T1_s)$, wherein $T1_{on}$ is a duration of an active mode section required for the signal to be received and $T1_s$ is a duration of a sleep mode section during which receiving of the signal is disabled and spanning successive active mode sections.

* * * * *